(12) United States Patent
Gershtein et al.

(10) Patent No.: US 10,467,477 B2
(45) Date of Patent: Nov. 5, 2019

(54) AUTOMATED PHARMACEUTICAL PILL IDENTIFICATION

(71) Applicant: PerceptiMed, Inc., Mountain View, CA (US)

(72) Inventors: Eugene Gershtein, Redwood City, CA (US); Alan Jacobs, Palo Alto, CA (US); Alexander Gebala, Palo Alto, CA (US)

(73) Assignee: PerceptiMed, Inc., Mountain View, CA (US)

( * ) Notice: Subject to any disclaimer, the term of this patent is extended or adjusted under 35 U.S.C. 154(b) by 0 days.

(21) Appl. No.: 16/252,504

(22) Filed: Jan. 18, 2019

(65) Prior Publication Data

US 2019/0258860 A1     Aug. 22, 2019

Related U.S. Application Data

(63) Continuation of application No. 15/792,723, filed on Oct. 24, 2017, now Pat. No. 10,229,321, which is a
(Continued)

(51) Int. Cl.
*G06K 9/00* (2006.01)
*G06K 9/62* (2006.01)
(Continued)

(52) U.S. Cl.
CPC ........... *G06K 9/00671* (2013.01); *G06K 9/00* (2013.01); *G06K 9/46* (2013.01); *G06K 9/4604* (2013.01);
(Continued)

(58) Field of Classification Search
None
See application file for complete search history.

(56) References Cited

U.S. PATENT DOCUMENTS 5,363,968 A    11/1994  Soloman
5,502,944 A     4/1996  Kraft et al.
(Continued)

FOREIGN PATENT DOCUMENTS

CN    1820283      8/2006
CN    101539991    9/2009
(Continued)

OTHER PUBLICATIONS

Asselin, D. et al., "Rotation and Scale Invariance with Polar and Log-Polar Coordinate Transformations," Optics Communications, 1994, pp. 391-404, vol. 104.
(Continued)

*Primary Examiner* — Wei Wen Yang
(74) *Attorney, Agent, or Firm* — Fenwick & West LLP

(57) ABSTRACT

A pill identification system identifies a pill type for a pharmaceutical composition from images of the pharmaceutical composition. The system extracts features from images taken of the pill. The features extracted from the pill image include color, size, shape, and surface features of the pill. In particular, the features include rotation-independent surface features of the pill that enable the pill to be identified from a variety of orientations when the images are taken. The feature vectors are applied to a classifier that determines a pill identification for each image. The pill identification for each image is scored to determine identification for the pharmaceutical composition.

18 Claims, 18 Drawing Sheets

Related U.S. Application Data continuation of application No. 14/373,596, filed as application No. PCT/US2013/022754 on Jan. 23, 2013, now Pat. No. 9,842,257.

(60) Provisional application No. 61/589,750, filed on Jan. 23, 2012.

(51) Int. Cl.
  *G06K 9/46* (2006.01)
  *G06T 3/60* (2006.01)
  *G06K 9/52* (2006.01)
  *G06K 9/68* (2006.01)

(52) U.S. Cl.
  CPC ............ *G06K 9/52* (2013.01); *G06K 9/6201* (2013.01); *G06K 9/6267* (2013.01); *G06T 3/60* (2013.01); *G06K 2009/6864* (2013.01); *G06K 2009/6871* (2013.01)

(56) References Cited

U.S. PATENT DOCUMENTS

| | | | |
|---|---|---|---|
| 5,700,998 | A | 12/1997 | Palti |
| 6,535,637 | B1 | 3/2003 | Wootton et al. |
| 6,640,008 | B1 | 10/2003 | Lee et al. |
| 6,771,369 | B2 | 8/2004 | Rzasa et al. |
| 7,028,723 | B1 | 4/2006 | Alouani et al. |
| 7,348,884 | B2 | 3/2008 | Higham |
| 7,613,336 | B2 | 11/2009 | Schultz |
| 7,844,084 | B2 | 11/2010 | Monro |
| 7,930,064 | B2 | 4/2011 | Popovich et al. |
| 8,121,392 | B2 | 2/2012 | Popovich et al. |
| 2002/0188466 | A1 | 12/2002 | Barrette et al. |
| 2004/0158350 | A1 | 8/2004 | Ostergaard et al. |
| 2006/0088196 | A1 | 4/2006 | Popovich et al. |
| 2006/0120570 | A1 | 6/2006 | Azuma et al. |
| 2006/0124656 | A1 | 6/2006 | Popovich |
| 2007/0110292 | A1 | 5/2007 | Bi et al. |
| 2007/0265880 | A1 | 11/2007 | Bartfeld et al. |
| 2008/0000979 | A1 | 1/2008 | Poisner |
| 2008/0063285 | A1 | 3/2008 | Porikli et al. |
| 2008/0119958 | A1 | 5/2008 | Bear et al. |
| 2008/0121000 | A1 | 5/2008 | Vessa |
| 2008/0219503 | A1 | 9/2008 | Di Venuto et al. |
| 2009/0012818 | A1 | 1/2009 | Rodgers |
| 2009/0127339 | A1 | 5/2009 | Needhan et al. |
| 2009/0208106 | A1 | 8/2009 | Dunlop et al. |
| 2009/0257663 | A1 | 10/2009 | Luo et al. |
| 2010/0042395 | A1 | 2/2010 | Rothschild |
| 2010/0046850 | A1 | 2/2010 | Ho et al. |
| 2010/0182615 | A1 | 7/2010 | Nakamura |
| 2011/0229029 | A1 | 9/2011 | Kass |
| 2011/0262536 | A1 | 10/2011 | Jordan et al. |
| 2013/0142406 | A1 | 6/2013 | Lang et al. |
| 2013/0329058 | A1 | 12/2013 | Brossette et al. |
| 2015/0303355 | A1 | 10/2015 | Furuyama |

FOREIGN PATENT DOCUMENTS

| | | |
|---|---|---|
| JP | 2001-312725 | 11/2001 |
| JP | 2003-517335 | 5/2003 |
| JP | 2003-518294 | 6/2003 |
| JP | 2004-288170 | 10/2004 |
| JP | 2008-310796 | 12/2008 |
| JP | 2011-517818 | 6/2011 |
| WO | WO 00/06078 | 2/2000 |
| WO | WO 01/46857 | 6/2001 |
| WO | WO 2008/137683 | 11/2008 |
| WO | WO 2011/112606 | 9/2011 |

OTHER PUBLICATIONS

Australian First Examination Report, Australian Application No. 2013212273, dated Jun. 22, 2017, 5 pages.
Australian Fourth Examination Report, Australian Application No. 2013212273, dated Jun. 20, 2018, 4 pages.
Australian Second Office Action, Australian Application No. 2013212273, dated Oct. 24, 2017, 4 pages.
Australian Third Examination Report, Australian Application No. 2013212273, dated May 25, 2018, 6 pages.
Chen, R-C. et al., "Automatic Drug Image Identification System Based on Multiple Image Features," Computational Collective Intelligence, Technologies and Applications, ICCCI 2010, Part II, LNAI 6422, Nov. 10, 2010, pp. 249-257.
Chinese First Office Action, Chinese Application No. 2013800141554, dated Oct. 8, 2016, 16 pages.
Chinese Second Office Action, Chinese Application No. 201380014155.4, dated Mar. 22, 2017, 12 pages.
Chinese Third Office Action, Chinese Application No. 201380014155.4, dated Jul. 7, 2017, 12 pages. (with concise explanation of relevance).
European Examination Report, European Application No. 13741445.4, dated Apr. 18, 2017, 5 pages.
European Examination Report, European Application No. 13741445.4, dated Jan. 2, 2018, 5 pages.
European Extended Search Report, European Application No. 11753941.1, dated Aug. 28, 2013, 6 pages.
European Extended Search Report, European Application No. 13741445.4, dated Jan. 29, 2016, 10 pages.
Ho, T.K. et al., "Decision Combination in Multiple Classifier Systems," IEEE Transactions on Pattern Analysis and Machine Intelligence, Jan. 1994, pp. 66-75, vol. 16, No. 1.
Jahr, I. "Chapter 3. Lighting in Machine Vision," Handbook of Machine Vision, Aug. 23, 2006 (Aug. 23, 2006), pp. 73-203.
Japanese Office Action, Japanese Application No. 2014-553533, dated Dec. 20, 2016, 11 pages.
Japanese Office Action, Japanese Application No. 2017-109898, dated May 22, 2018, 5 pages.
PCT International Search Report and Written Opinion of the International Search Authority, PCT/US2011/027586, dated Jul. 18, 2011, 16 Pages.
PCT International Search Report and Written Opinion, Application No. PCT/US2013/022754 dated Apr. 1, 2013, 13 pages.
United States Office Action, U.S. Appl. No. 14/373,596, dated Apr. 6, 2017, 20 pages.
United States Office Action, U.S. Appl. No. 14/373,596, dated Aug. 18, 2016, 15 pages.
United States Office Action, U.S. Appl. No. 15/792,723, Mar. 7, 2018, 20 pages.

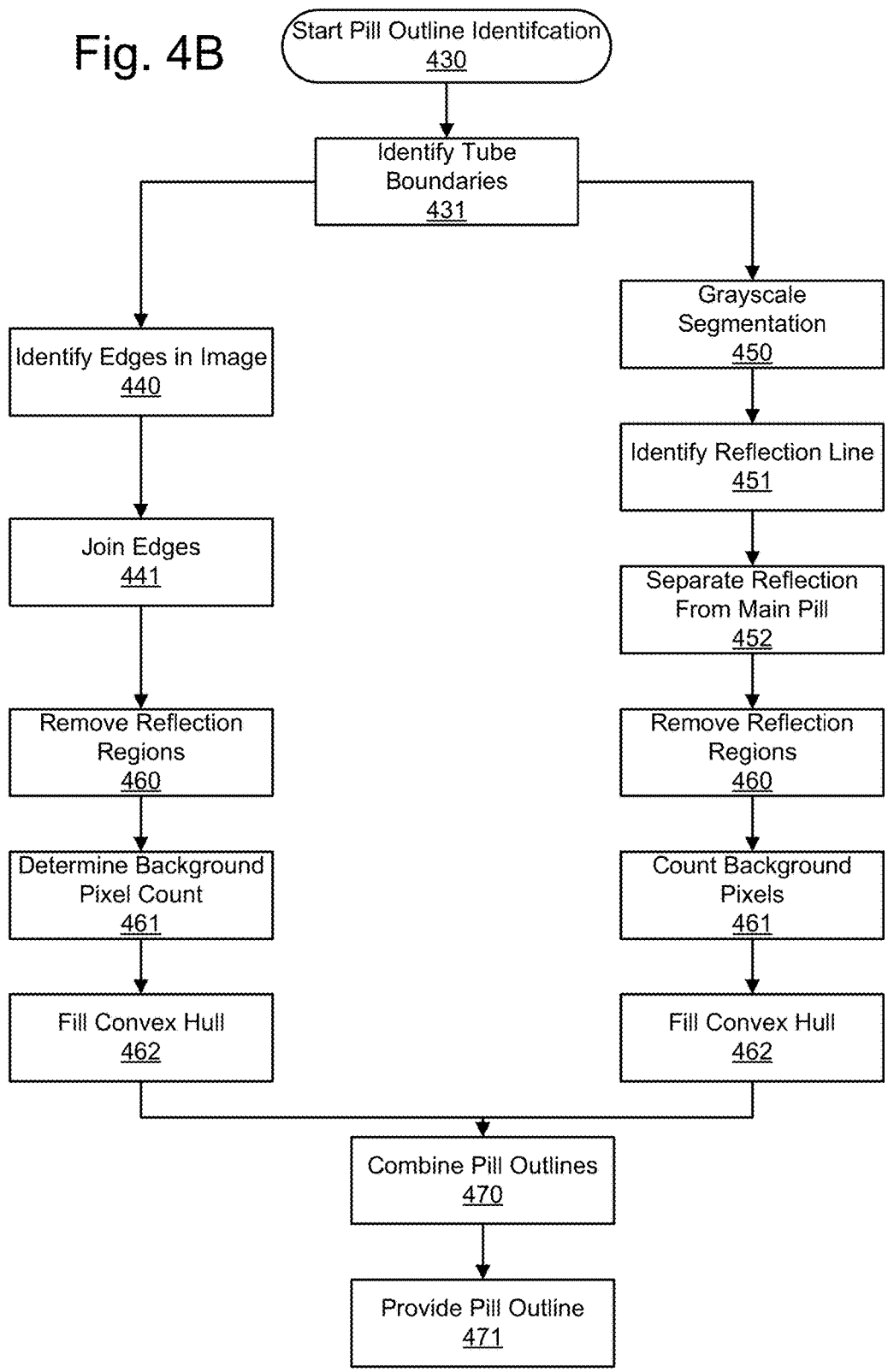

AUTOMATED PHARMACEUTICAL PILL IDENTIFICATION

CROSS REFERENCE TO RELATED APPLICATIONS

This application is a continuation of U.S. application Ser. No. 15/792,723, filed Oct. 24, 2017, which is a continuation of U.S. application Ser. No. 14/373,596, filed Jul. 21, 2014, now U.S. Pat. No. 9,842,257, which is a national stage application of PCT/US2013/022754, filed Jan. 23, 2013, which claims the benefit of U.S. Provisional Application No. 61/589,750, filed Jan. 23, 2012, each of which are incorporated herein by reference in their entireties for all purposes.

BACKGROUND

This disclosure relates generally to image processing, and more specifically to identification of pharmaceutical compositions (e.g., pills) by automated means.

Medication errors cause at least one death every day in the United States and injure approximately 1.3 million people annually. A Food and Drug Administration (FDA) study of fatal medication errors found that the most common errors involving medications were related to the administration of an improper dose of medicine (41%) and administration of the wrong medication (14%). Almost half of the fatal medication errors occurred in people over the age of 60, who often take multiple prescription medications. Such medication errors continue to occur despite federal regulations implemented in 1995 that require imprinting of identification codes on all medication solid oral-dosage forms.

The task of administering medications to a patient in a hospital or nursing home environment remains a manual process with limited quality assurance and a task that is highly subject to human error. Typically, a nurse reads a patient's prescription, opens a bottle of pills with the intended medication, places the pills in a small unlabeled plastic cup, carries the cup to the patient's bedside, and directs the patient to take the pills in the cup. There is no independent quality assurance process to confirm 1) that the correct medication and number of pills are placed in the plastic cup, 2) that the medications are delivered to the correct patient, or 3) that the medication is being administered at the correct time (e.g., not more than every 4 hours).

Likewise, patients in a home environment shoulder a substantial amount of responsibility in managing their own medications, which can result in medication errors. Common errors in the home include taking the wrong dosage or quantity of pills, forgetting to take certain medications or doses, taking the medication at the wrong time, too many times a day, or not enough times a day, among other problems. For patients taking multiple medications a day or having medication regimes involving complex timing and administration factors, careful day-to-day management of medications can become quite difficult.

Errors in medications can also arise in the pharmacy environment. Filled prescriptions can be mislabeled with the incorrect dosage or amount of pills, or with the incorrect medication. Pharmacists can dispense the wrong drug, quantity, or dosage, which are mistakes that can result in serious injury or death of the patient. Pharmacists can make these types of mistakes as a result of being overworked or distracted, or even due to confusion between medication names that are similar, or pills that have similar physical appearances.

What is needed is a mechanism for quickly and easily identifying medication in an automated way to ensure the correct medication and dosage are provided. As part of an automated medication and dosage system, pills must be identified and confirmed as the intended pill for a patient. A particular challenge of automated identification of pills is that a pill may be identified by any arbitrary markings chosen by a pharmaceutical company. For example, pills may include arbitrary shapes, surface features, lettering fonts and orientation, color, and the like. These aspects of a pill's character provide particular challenges to pill identification methods. In addition, solutions that require a pill to be oriented in a particular way for identification cause undue delay as a machine or operator orients the pill.

SUMMARY

A pill identification system is provided that identifies a pill by extracting features from images taken of the pill. The features extracted from the pill image include rotation-independent surface features of the pill that enable the pill to be identified in various orientations as the image is taken.

A computer-implemented system, method, and computer-readable medium for identifying a pharmaceutical composition are provided. At least one image of the pharmaceutical composition is accessed, wherein each image provides a distinct image of the pharmaceutical composition. Features are extracted from each image of the pharmaceutical composition, the features including a rotationally-independent measure of surface features in the image. A feature vector is generated for each image of the pharmaceutical composition that includes the features extracted for that image. At least one classifier is applied to each of the feature vectors to determine at least one classification associated with each image. A pill identification is determined by accumulating the at least one classification for each image.

BRIEF DESCRIPTION OF THE DRAWINGS

FIG. 4B illustrates another pill outline identification process according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION (a) Overview

An image classification method and system for identifying pharmaceutical compositions (e.g., pills, which can include any type of pill, tablet, capsule, or other pharmaceutical composition) is provided according to an embodiment. The image processing method provides an identification of pills by extracting features from images taken of a pill, applying a scoring algorithm to the extracted features, identifying a best-match pill for each image from a pill identification database, and identifying the pill according to the most confident best-match pill from the identified best-match pills.

In one embodiment, the image classification system is part of a pill dispensing and/or verification system. One example of such a system is disclosed in International Patent Application No. PCT/US2011/027586, filed on Mar. 8, 2011, which claims priority to U.S. Provisional Application No. 61/311,900, filed on Mar. 9, 2011, both of which are hereby incorporated herein in their entireties, however other systems for dispensing and/or verification can also be used or the image classification can be done independent of such a dispensing and/or verification system. In this example pill dispensing and verification system, a pill is introduced into the system and the system captures images of the pill using cameras or other imaging devices placed around the pill. The images are provided to the image classification system to determine whether the pill images match the characteristics of pills in a database. Specifically, features are extracted from the pill images to form a feature vector to enable comparison of the images to features of known pills in a feature database. The identification of the pill is used by the system to determine, for example, whether the pill is part of a prescribed dosage for a patient.

Figure 1:
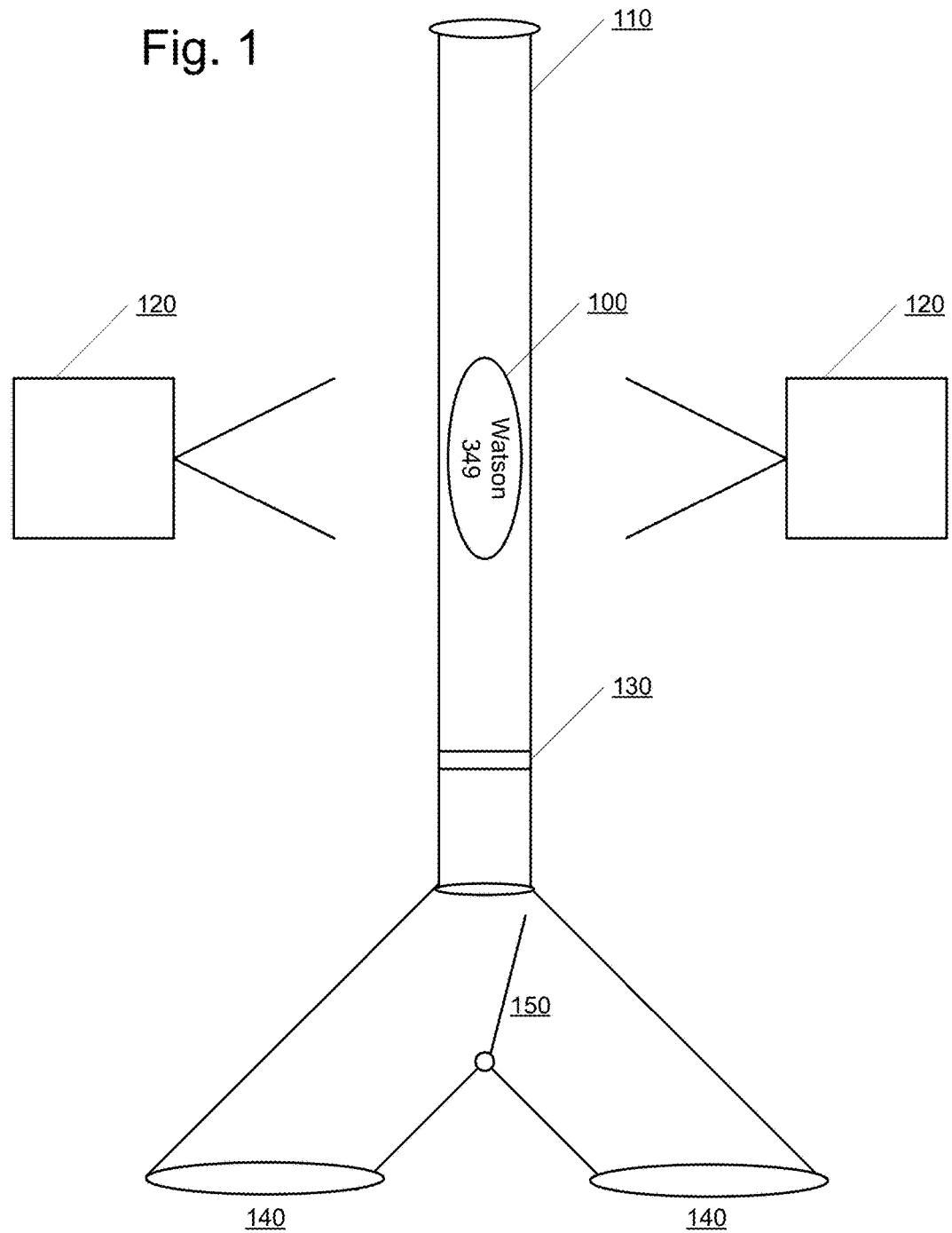
FIG. 1 provides a conceptual view of an example pill verification system according to an embodiment.

FIG. 1 shows a conceptual view of an example pill verification system. A pill 100 travels down a tube 110 or pathway during the imaging process. The tube 110 is typically clear and enables cameras 120 to have an unobstructed view of the pill 100. The tube 100 may be configured to at least partially orient the pill to reduce the variation among pill images. In one embodiment, a square tube 100 is used at a slanted angle to encourage the pill to slide along a flat side of the pill, rather than freefall along any angle. Cameras 120 capture images of the pill 100 as the pill passes through the tube 110, and the images are processed for pill identification. These images can be taken of the pill while the pill is moving through the system. The system does not require that the pill be stopped or held stationary while the images are taken, but instead can takes image of the pill in motion.

In one embodiment, the end of the tube 110 includes a gate 130 that stops the pill until the identification is complete, such as while the pill images are being processed. Some embodiments do not include gate 130. When the identification is complete, a diverter 150 is moved to direct the pill into either a positive or negative result bin 140. The pill is diverted to the positive result bin 140 if the pill is identified as a pill and dosage prescribed to the patient, and to the negative bin 140 otherwise. Once the diverter is in place, the gate 130 opens and the pill is directed to the appropriate result bin 140. In other embodiments, other criteria determine whether to place the pill in the positive bin. For example, in some configurations, any quantity of a specific type of detected pill is diverted to the positive bin. In further embodiments, several result bins 140 are used, and each pill type is diverted according to its identification. Several result bins may be used, for example, to sort a mixture of different types of pills. Thus, a user adds pills to the verification system and receives a quick and automated determination of a pill's identity. Since the pill is identified as the pill proceeds through the tube 110, the system is able to identify and sort pills quickly. In other embodiments, positive and negative bins are not used, but instead the system indicates whether each pill has been positively or negatively identified (i.e., a positive or negative match to a designated pill type) or otherwise provides an indication of or information about the pill type or identity.

(b) Pill Classification Overview

Figure 2:
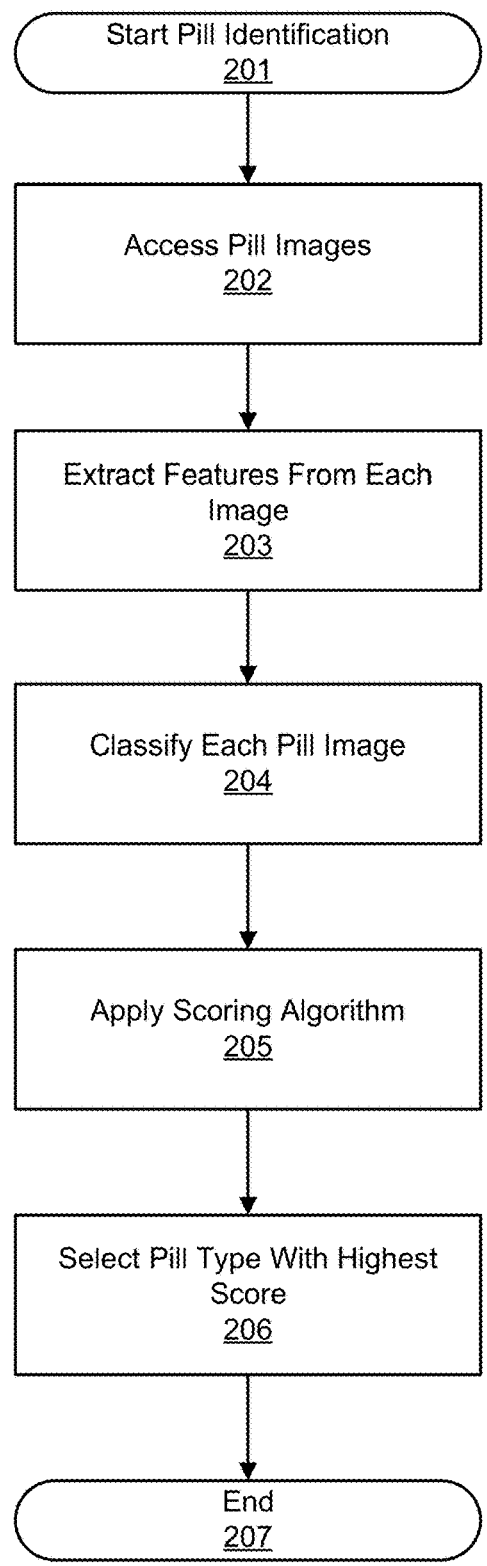
FIG. 2 illustrates an overview of a method for identifying a pill from pill images according to an embodiment.

FIG. 2 illustrates an overview of a method for identifying 201 a pill from pill images according to one embodiment. This figure provides just one example of steps that may be included in the method, but the steps may vary or may be differently ordered in other embodiments. The same is true for all methods described throughout. In FIG. 2, first the system accesses 202 images of a pharmaceutical composition (e.g., the pill), for example from cameras 120. Alternatively, pill images are accessed by receiving pill images from a system separately from cameras 120. That is, the pill identification method described herein may be useful for any application that identifies a pill from one or more pill images.

In order to classify the pills, features are extracted 203 from each of the pill images. As described in detail below, the features extracted from the pills in this embodiment include color, size, shape, and surface features, though any suitable features or set of features may be used. The extracted features are used to create a feature vector that represents the pill image using the features associated with the pill image. Next, each image from the camera is classified 204 by a classification algorithm to identify the most likely pill represented in the image. After classification of each image, the results from the classifiers are scored 205 to merge results from the various images. Since the images may provide differing pill identifications, the scoring 205 determines scores for each candidate pill type to select 206 the pill type with the highest score.

Figure 3:
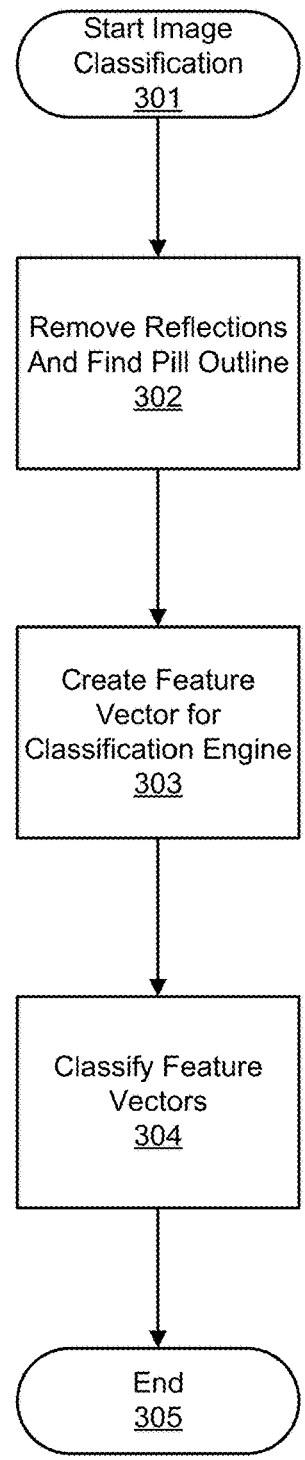
FIG. 3 illustrates an overview of an embodiment of feature extraction and image classification according to an embodiment.

An overview of an embodiment of the feature extraction and image classification methodology (e.g., steps 203 & 204 of FIG. 2) is described with reference to FIG. 3. The image classification starts 301 with a raw image photograph or other image of the pill. In order to extract features from the image corresponding to the pill, the portion of the image containing the pill is identified. To identify the pill, the pill identification system determines the pill's outline and removes reflections in the image 302. Once the pill has been identified, feature vectors are created 303 from the pill image through a variety of image processing techniques. That is, in this embodiment, each pill image is associated with a feature vector representing the pill image. The features extracted from pill image are classified 204 by the classification algorithm. The classification algorithm uses a variety of classification methods and can output a Boolean best-match pill type for the image, or alternatively the classification method indicates a best-match pill type using a confidence value. The classifier may be any suitable machine-learning classification system, such as a support vector machine (SVM).

Prior to classifying feature vectors 304, the pill classifier is trained on a plurality of images of known pills. Using a training process, a variety of training images is used that includes information about the corresponding pill types for the training images. The pill classifier is trained on the features extracted from the training images to determine the features that characterize each pill type. Though described as a single pill classifier, the pill classifier can comprise a plurality of classifiers, where each classifier is trained on the set of features and pill types for that particular classifier. As described below, the classifiers may be hierarchically organized, wherein a high-level classifier is used to discriminate among easily differentiated feature vectors. For example the high-level classifier may discriminate based on color, distinguishing pills as white, brown, red, blue, etc. In training, the pills may be designated by the operator as belonging a particular type (e.g., color), or the feature vectors may be automatically clustered. The feature vectors associated with the pill types in the clusters are used to train the high-level classifier. After classification to a high-level group, a lower-level classifier may further distinguish among additional clusters, or may classify the feature vector as a pill type. In one embodiment, the classifiers are maintained in a pill classification database.

(c) Pill Outline Detection

In one embodiment, prior to processing an image to extract features, the image of the pill is processed to identify the location of the pill within the image and to orient the pill. This pill outline identification is used to clean up the image and ensure that the features extracted from the image are features which originate from the pill and not from background noise or other aspects of the image. This pill outline identification is also used because images may capture all or part of the pill located at various areas of the image and particular pill types have a variety of shapes and sizes.

Figure 4A:
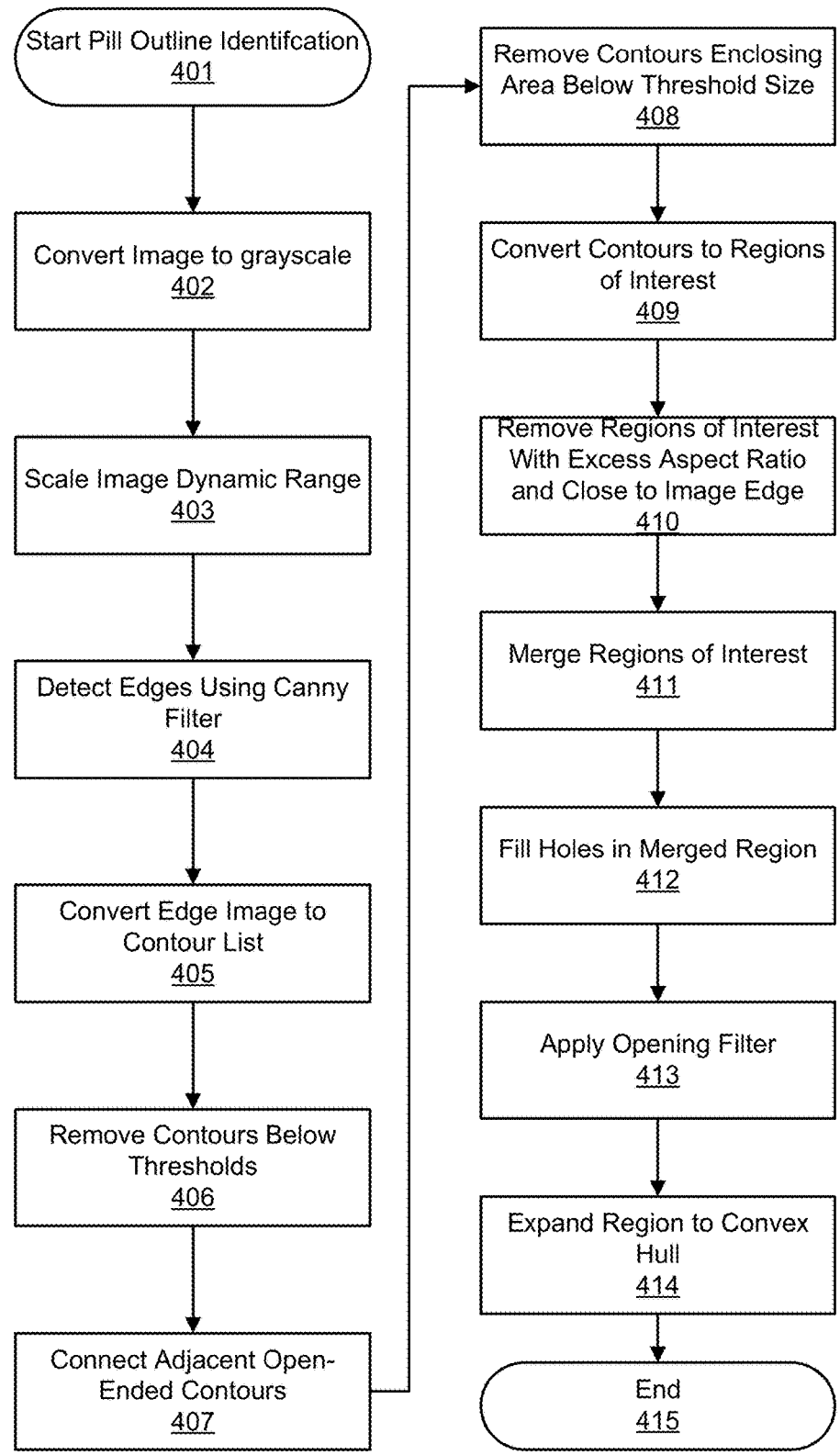
FIG. 4A illustrates a pill outline identification process according to an embodiment.

One embodiment of a pill outline identification process is described with reference to FIG. 4A. The pill outline identification process starts 401 by converting 402 the image to grayscale. Next, the grayscale range of the image is dynamically scaled 403 to calibrate the color range of the original grayscale image to a full grayscale range. In other words, if the original grayscale range uses a value range of 20-60 in a processing range capable of 0-255, the value range 20-60 is scaled to use the entire 0-255 range. Next, edges contained within the pill image are detected 404. This can be done using a Canny filter or another mechanism for identifying the edges. The detected edges may comprise portion of the pill image with a sharp contrast from one portion to another, such as the actual edge of the pill, but also surface marks, such as any lettering on the pill, other imprints on the pill, and other aspects of the image with high contrast. Thus, the "edges" as described in this portion do not initially make up the outline of the pill.

Continuing with this embodiment for pill outline identification, the detected edges are now converted 405 to a contour list. Each contour corresponds to an individual contiguous edge detected in the image. The segments are inspected and contours that fail to meet minimum thresholds are removed 406 from the contour list. For example, contours may be required to meet a minimum length and a minimum aspect ratio, such as an aspect ratio greater than 0.1, and a minimum area (i.e. the number of pixels in the contour). Shadows and other noise can detected and removed in this way, which increases the probability that only the contours that are a part of the pill outline are selected. Next, open-ended contours are analyzed to determine if the opening of one contour matches the opening of another contour by identifying adjacent open-ended contours and connecting 407 the adjacent contours. After connecting contours, the contours now include enclosed spaces. The enclosed spaces which fail to enclose a minimum area are rejected 408. Next, the contours are converted 409 into regions of interest. Another filtering step removes 410 the regions of interest whose aspect ratio exceeds a minimum threshold and regions that are too close to the edge of the field of view. Phrased another way, regions of interest which are too close to the edge of the pill or which are excessively elongated are assumed not to constitute portions of the pill for outline detection purposes.

The remaining regions of interest are now merged 411 into a single region of interest and any holes in the region of interest are filled 412. Next, the region of interest is smoothed by applying 413 an opening filter to remove any protrusions outside the outline of the region of interest. Finally, the region of interest is expanded to fill the internal spaces. That is, any internal spaces are expanded 414 to the convex hull of the region of interest. This creates the pill outline that may be used for extracting features of the pill.

Another method of identifying a pill outline is shown in FIG. 4B according to one embodiment. In this method, the pill outline is determined by two pill outline methods operating in parallel. The two methods are compared to determine which method provided the better result and may be combined to generate the final pill outline. After starting 430 the pill outline identification, a step identifies 431 tube boundaries in the image. The image of the pill 100 taken by the cameras 120 may include portions of the tube in the pill image. The tube boundaries are typically identified in the upper and lower regions of the image, though the locations will vary based on the arrangement of the tube 110 and cameras 120. In one embodiment, the tube boundaries are identified by lower-intensity regions in the corners of the image (upper left/right and lower left/right). The location and angle of the tube boundaries is identified and computed.

In the first outline determination method, a set of edges is identified 440 in the image by identifying high-contrast areas in the image. The edges may be detected by any suitable method, such as through a canny filter. Next, the edges identified in the image that are adjacent to each other are joined 441. In one embodiment, the joined adjacent edges are cotangent to one another. After joining, pill regions are created from edges that form closed contours.

Next, reflective regions are identified and removed 460. Reflective regions are determined by comparing pill regions with the tube boundaries and the edge of the image. Pill regions that are portions of the tube boundaries and regions that are predominantly near the edge of the image (e.g. the top and bottom) are removed from the pill region list. For the remaining pill regions, a count of background pixels is determined 461 that indicates the extent to which the pill regions enclose pixels that are likely part of the pill background. The background pixels are determined by identifying pixels that are dark in all color channels (i.e. in all color types). The threshold for darkness may be determined based on the configuration of the tube 110 and cameras 120. When the background pixel count is high, it indicates that the pill regions may be significantly larger than the pill, and indicates there may have been an error in the pill outline determination. Finally, the pill regions are filled 462 to the convex hull of the pill region list. This combines the pill regions to produce a pill outline that removes negative curvature inflections.

The second outline detection method starts with grayscale segmentation 450 of two different mathematically derived images from the original RGB image. The first grayscale image is created from the variation in the saturation color channel. While the color may change in the pill from region to region, the saturation is typically relatively consistent throughout the pill and noisy in background portions. The second grayscale image is an image of the maximum grayscale pixel value of each of the RGB color channels. The segmentation results from each image are combined into a single pill region. Next, pill reflections are determined by identifying reflection lines 451. The reflection lines use a convolution kernel to identify horizontal line pixels. The horizontal line pixels are identified in the tube boundaries to identify likely portions of the reflection. The pixels from the convolution kernel are combined to identify the reflection line 451. Using the reflection line, the region of interest generated by the grayscale segmentation 450 is broken into multiple disconnected regions by separating the reflection from the pill regions 452. The separation of the pill regions is based on the reflection line. The pill regions associated with reflections are removed 460, background pixels counted 461, and the regions are filled to the convex hull 462 as described above. Thus, two sets of regions of interest are created, the first through edge detection, and the second through grayscale segmentation.

Next, the two pill outlines are combined 470. The outlines from the edge-based and grayscale-based outlines are used to determine a single pill outline. The combined outline may be the pill outline from one of the two pill outlines, or may be a combination of the pill outlines. The determination of which combined outline to use is determined based on the background pixel count of each region of interest. When the background pixel count is significantly lower for one pill outline relative to the other, the lower pill outline is selected as the combination pill outline. When both pill outlines have similar pixel counts, the union of the regions of interest for each pill type is used to determine the regions of interest in common to both. In addition, remaining inflection points may be identified by analyzing inflection points in the regions of interest. The inflection points are examined to determine if the inflection points make up a line. If such a line is identified in the region of the image associated with the tube, the region of interest associated with the line is removed from the pill outline and the remaining regions of interest are returned as the pill outline.

As a result of the foregoing methods, the outline for the pill is identified and can be used for extracting features of the pill for use with a pill classification method. The foregoing is one embodiment of a pill outline identification method; other methods of identifying the pill's outline may be used in other embodiments.

(d) Feature Vectors

Using the identified pill shape from the image, features are extracted from the images and feature vectors are constructed to characterize the pill image. The feature vectors are used by a classification system, both to train classifiers by associating the pill images with a known pill type, and by using the trained classifiers to identify an unknown pill. In one embodiment, the feature vectors comprise components extracted from the pill's shape and size, surface features of the pill, and color components of the pill.

Figure 5:
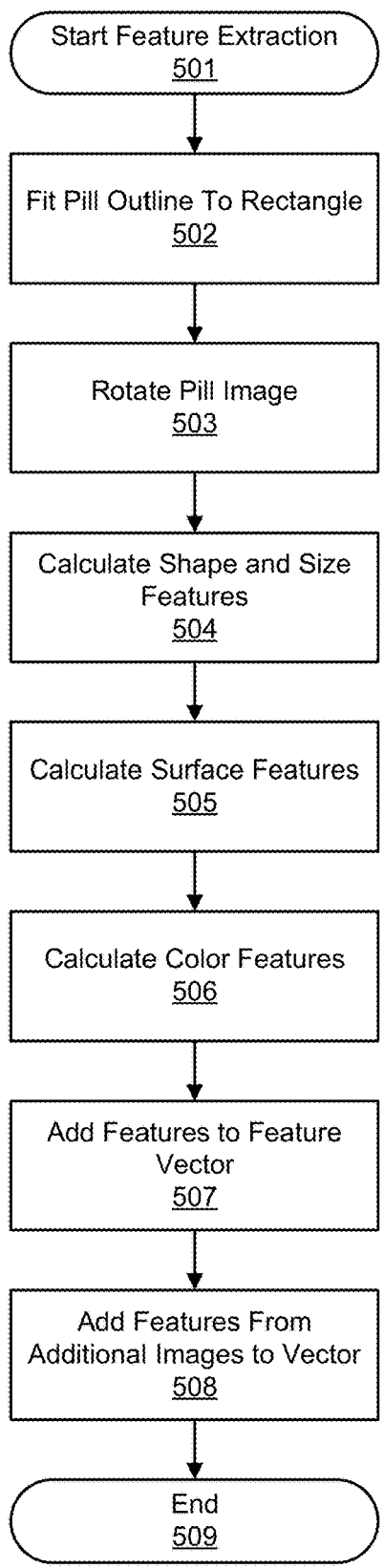
FIG. 5 illustrates a method for extracting features from a pill image according to an embodiment.

An embodiment of a method for extracting features from a pill image is shown in FIG. 5. Feature vector creation begins 501 after determining the outline of the pill as discussed above. First, a rectangle is generated enclosing the pill outline and it is reduced in size until the smallest rectangle to enclose the pill outline is determined 502, such that the rectangle may have any orientation around the pill outline. Next, the enclosed pill outline is rotated 503 so that the rectangle with the pill outline is horizontal. That is, the rectangle is used to rotate the pill to a predominantly horizontal position, such that aspect ratio and other features are easily and consistently measured across pill images. Other methods of rotating the pill image to a horizontal position may be used, or features are calculated in some embodiments without rotating the pill image. In this embodiment, features are extracted from the rotated pill image. As an overview, shape and size components are calculated 504, surface-feature components are calculated 505, and color components are calculated 506 from the pill outline. The generation of these various components is described in further detail below. These components are added 507 to a feature vector associated with the image.

In addition, features from the other images taken of the pill may be added 508 to the feature vector and sorted in order to better characterize some types of features. In this embodiment, size and color features from each image are be added to the respective portions of the feature vector for each image. For example, a size-related area feature of each image is added to the area feature vector of each image. Prior to adding the area feature data, the data for the images is concatenated and sorted. Thus, if three images include associated area features of 19, 32, and 25, the area features are concatenated and sorted to generate a set of area features {19, 25, 32} that is added to each feature vector for the three images. The addition of such data enables the classifier to train on data indicating, for example, that the image which shows a short side of a pill is in fact the short side of a generally oblong pill. The features that are added to each feature vector in this way are described more fully below, and include size-based features of area, length, and aspect ratio. A feature describing the surface-feature complexity of each image may also be added to each feature vector. This feature may indicate generally, for example, the distribution of surface textures on various sides of the pill.

(e) Feature Vector—Shape and Size Components

Using the pill image and outline, one embodiment generates a variety of shape and size components for the feature vector. The size and shape calculations include, for example, the length of the longest dimension, the length of the pill outline, the area, the aspect ratio, the circularity, the compactness, convexity, bulkiness, and structure factor.

The circularity measures the similarity of the pill outline to a circle, and is calculated in one embodiment by calculating the area of the region and dividing the area by the maximum distance from the center to the contour pixels squared, multiplied by pi (Circularity=(area)/(maximum distance)$^2$*$\pi$).

The compactness measures the length of the contour relative to the area of the region. The compactness is measured in one embodiment by squaring the length of the contour and dividing the result by four times the area of the region multiplied by pi (Compactness=(contour length)$^2$/(4*area*$\pi$)).

The convexity measures the input regions to determine a measure of the level of convexity for a region. The convexity is measured in one embodiment by dividing the original area of the region by the area of the convex hull (Convexity=(area of the region)/(area of the convex hull)).

The bulkiness and structure factor are features that can be derived from elliptical parameters derived from the region. The region is converted into an elliptical measurements for radius A $R_a$, radius B $R_b$, and an area A, where $R_a$ is $\geq R_b$. An additional feature, anisometry, can be calculated in one embodiment as the ratio of $R_a$ to $R_b$ (Anisometry=$R_a/R_b$). The bulkiness is calculated in one embodiment as pi multiplied by $R_a$ and $R_b$, divided by A (Bulkiness=$\pi$*$R_a$*$R_b$/A).

The structure factor is calculated in one embodiment as the Anisometry multiplied by the Bulkiness minus one (Structure Factor=(Anisometry*Bulkiness)−1).

(f) Feature Vector—Surface Features with Rotational Independence

Figure 6:
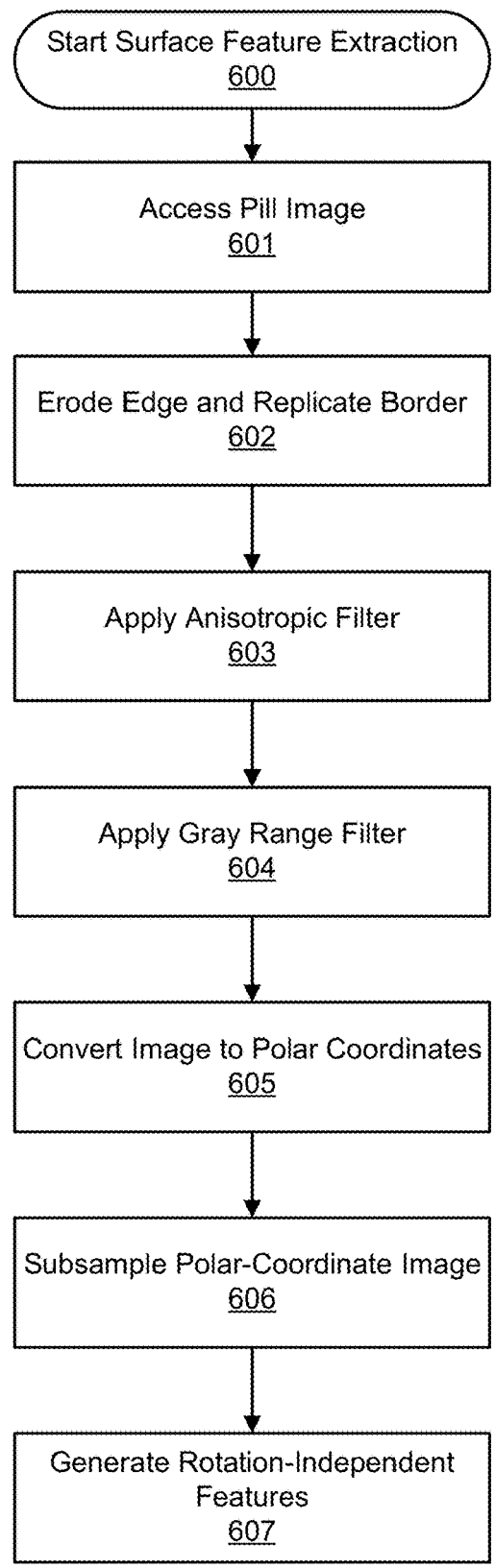
FIG. 6 illustrates a method of extracting surface features from a pill image according to an embodiment.
Figure 7:
FIGS. 7-13 illustrate image processing techniques used for extracting surface features according to an embodiment.

Additional features can also be extracted from the image to reflect the surface features of the pill, in one embodiment. FIG. 6 is a flowchart illustrating a method of extracting surface features from a pill image in one embodiment. FIGS. 7-13 illustrate image processing techniques used according to an embodiment for extracting surface features. FIG. 6 is described herein with joint reference to FIGS. 7-13 to illustrate the image processing. After starting the surface feature extraction 600, the pill image is accessed 601. The accessed image is converted to grayscale as shown in FIG. 7. In the image shown in FIG. 5, a grayscale image of the pill is shown after smoothing the image received from a camera or other imaging device.

Figure 8:
Figure 9:
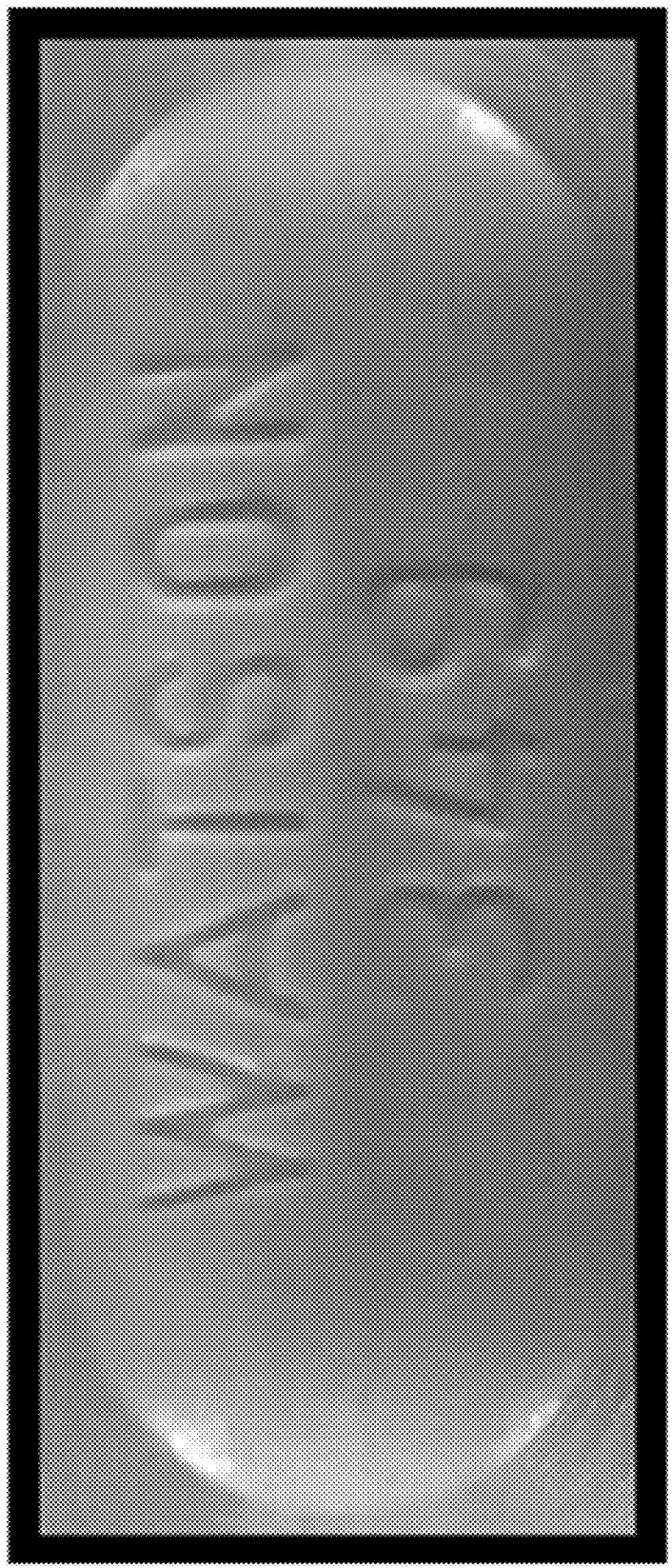

Next, using the outline of the pill, the pill edge is eroded and the pill border is replicated 602 outward to smooth the transition from the pill to the remaining portions of the pill image. The resulting erosion and replication is illustrated in FIG. 8. An anisotropic filter is applied 603, which further smoothes the pill image and enhances contrasting features in the pill. The pill image after the anisotropic filter is shown in FIG. 9.

Figure 10:
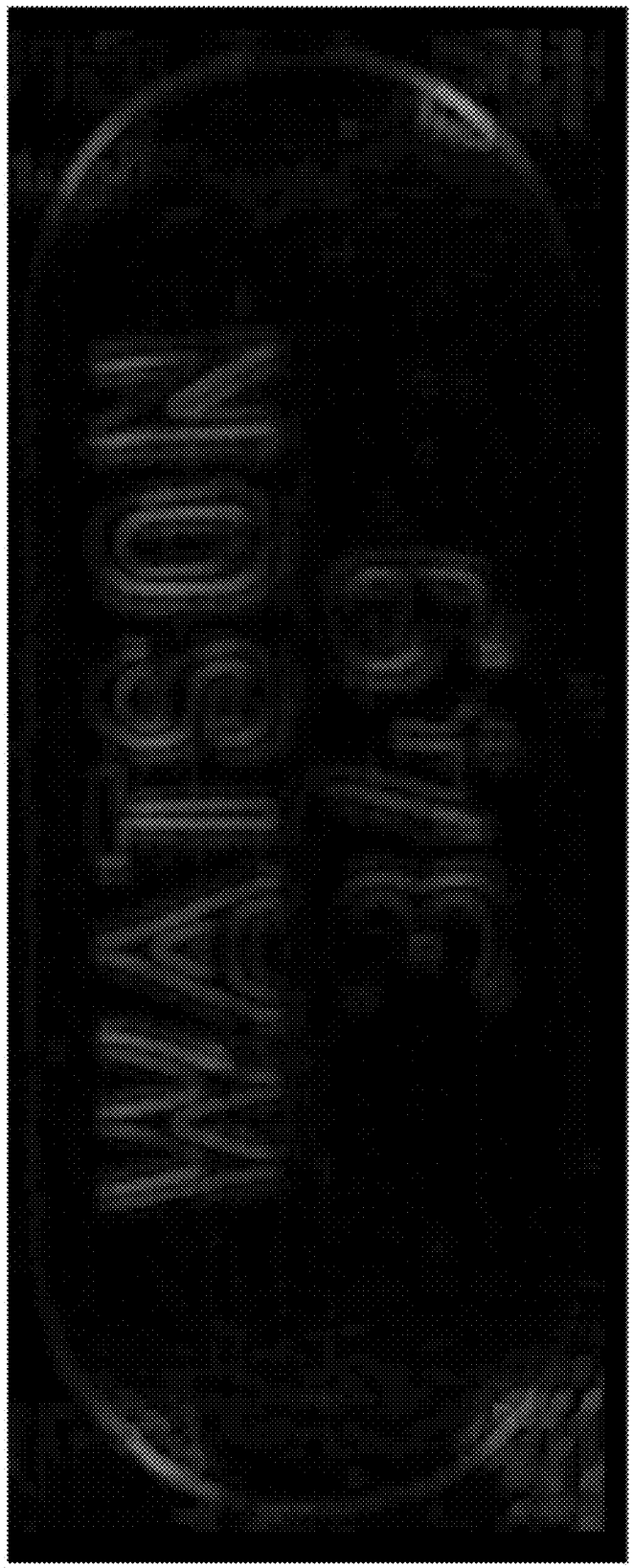

Next, a gray range filter is applied 604. The gray range filter converts the image such that the value of each pixel is equal to the range difference of gray values in a square of a given size around the pixel. The result emphasizes surface features in the image and is shown in FIG. 10. In one embodiment, a feature representing the surface complexity is captured by integrating over the image shown in FIG. 10. The surface complexity feature may act as a proxy for the amount of surface information available from the pill surface in that image and may be used for scoring pill classifications as described below. In other embodiments, a measure of surface complexity may be obtained at another point in the surface-feature process.

Figure 11:
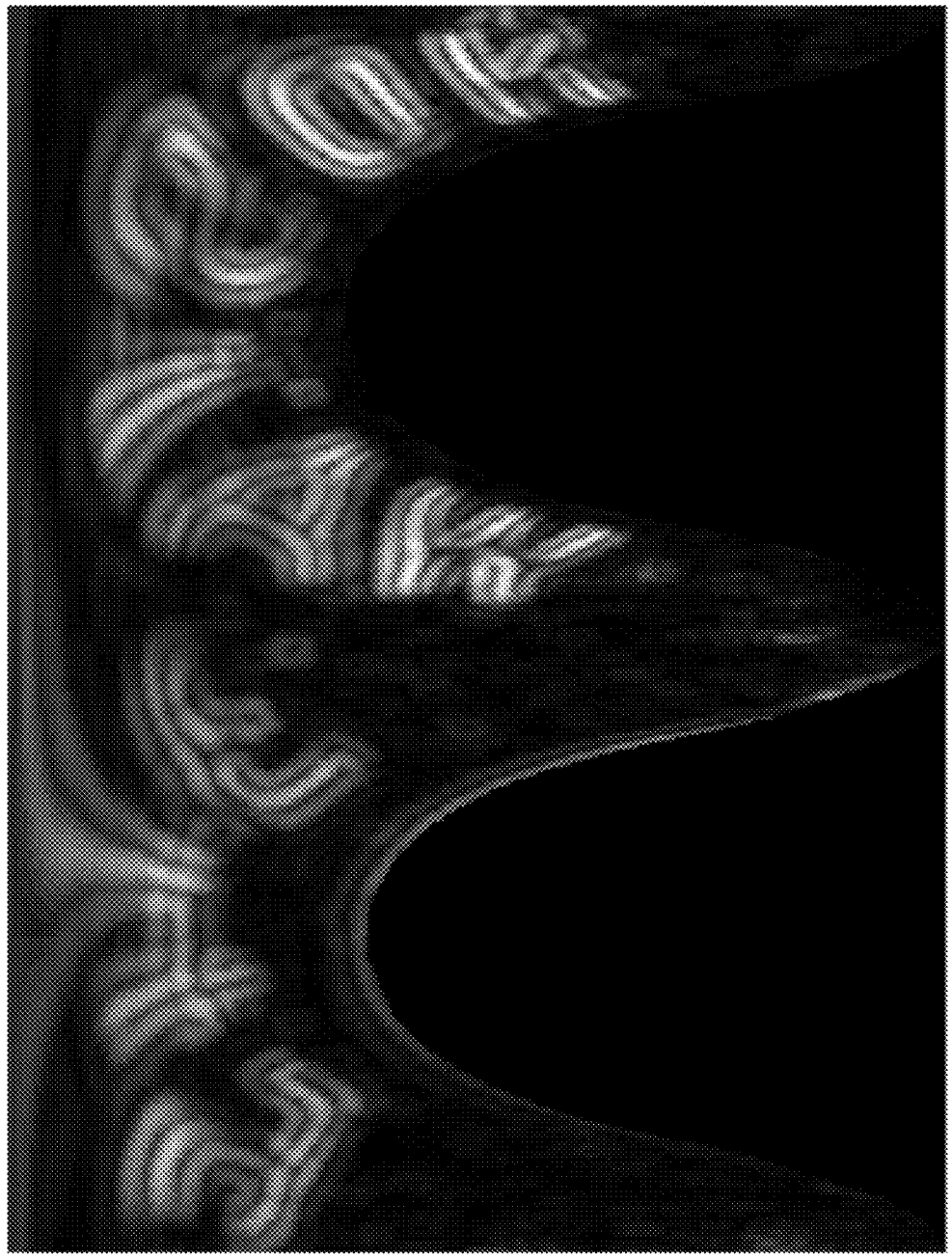

Since the image could have been captured from a variety of angles, especially if the pill is rotating or otherwise in motion as the images or taken, the next processing step provides rotational independence to the captured image by converting the image to polar coordinates 605 as shown in FIG. 11. By using a combination of polar coordinates and polar-independent statistics, various pill rotations produce similar feature vectors. The similar feature vectors are possible because the polar transformation enables statistics calculated on rows of the polar image which are independent of the pill rotation in the original image. The rotational independence allows reliable classification using a wide variety of pill images.

Figure 12:
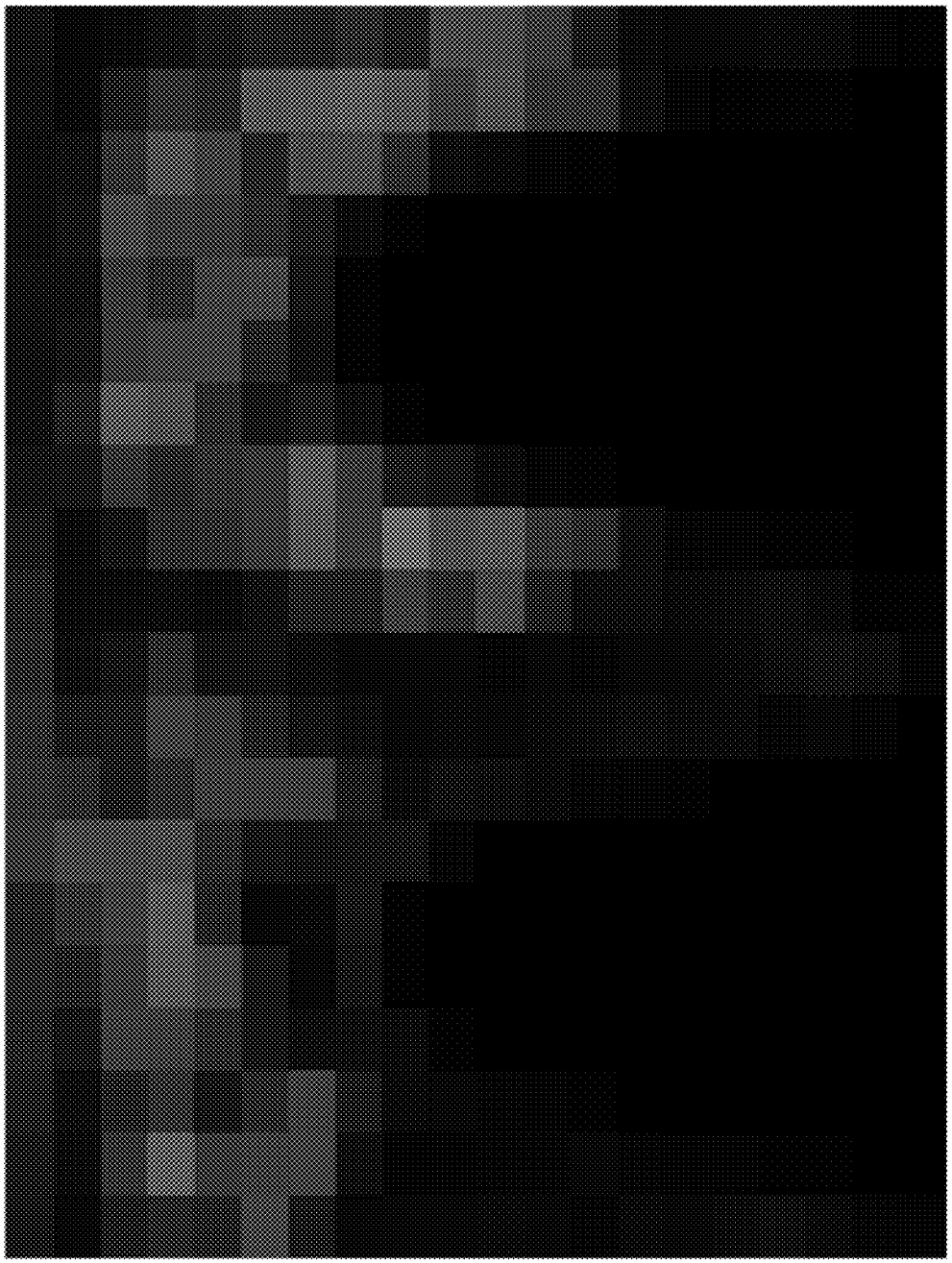
Figure 13:
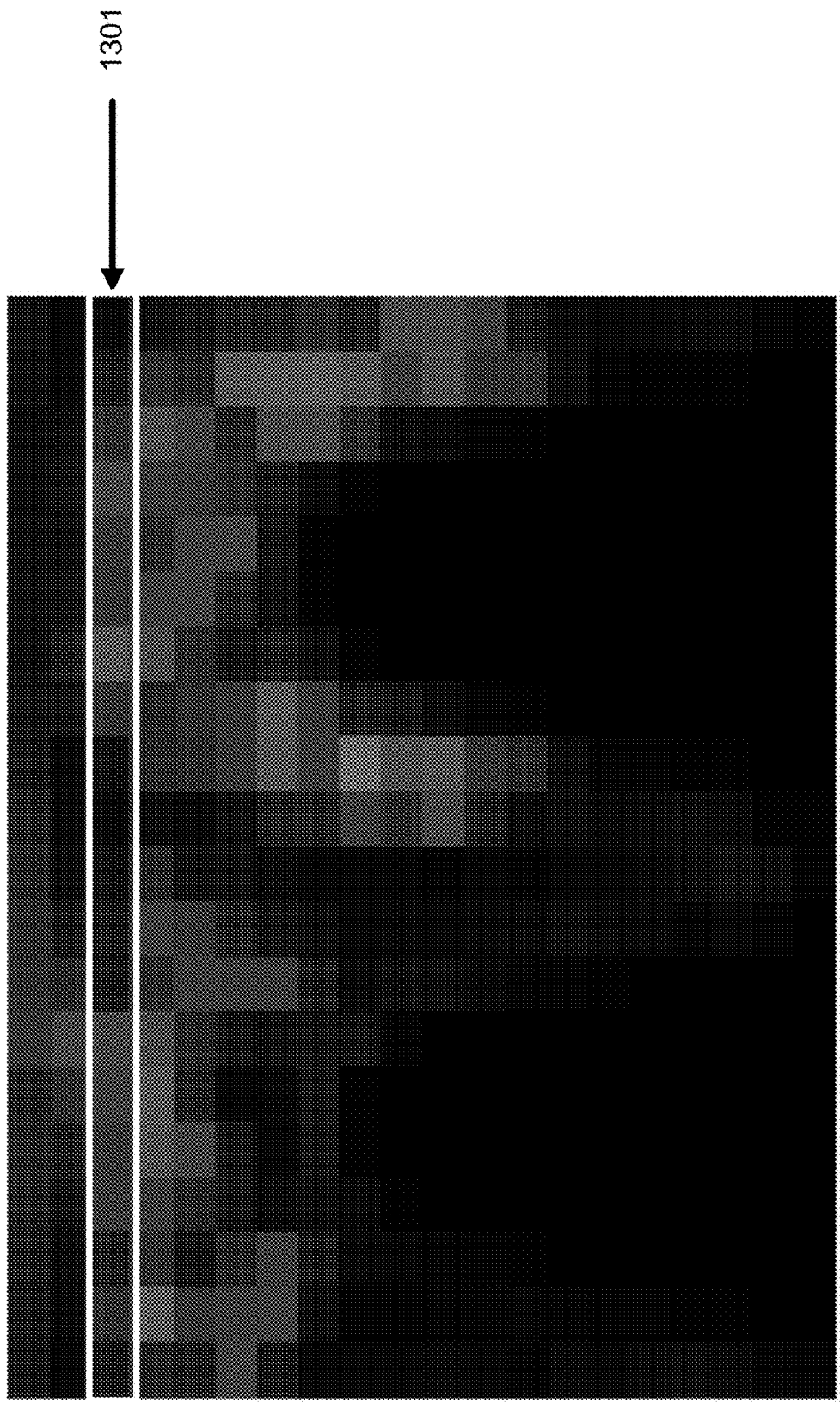

Next, the polar-coordinate image is subsampled 606 in one embodiment as shown by FIG. 12. The subsampling technique generalizes the data and reduces the likelihood the features produced by the same pill type substantially differ. Next, the subsampled image can be divided into rows as seen in FIG. 13. Each row 1301 is used to generate 607 a set of rotation-independent surface features. Since each row is in polar coordinates, each row represents a "ring" radially outward from the center of the original image. The features extracted from the row 1301 are independent of pixel order. As a result, the features characterize each ring extending outwardly from the center of the original image. The use of polar coordinates and features measured independent of pixel order provide a rotation-independent feature set. The features extracted from the row 1301 can include mean gray value, standard deviation of gray values, entropy of gray values, and anisotropy of gray values. In practice, any characteristics could be used which provide measurements of a row which is rotationally-independent. The features extracted from the subsampled polar image are appended to the feature vector.

(g) Feature Vector—Color Components

Figure 14:
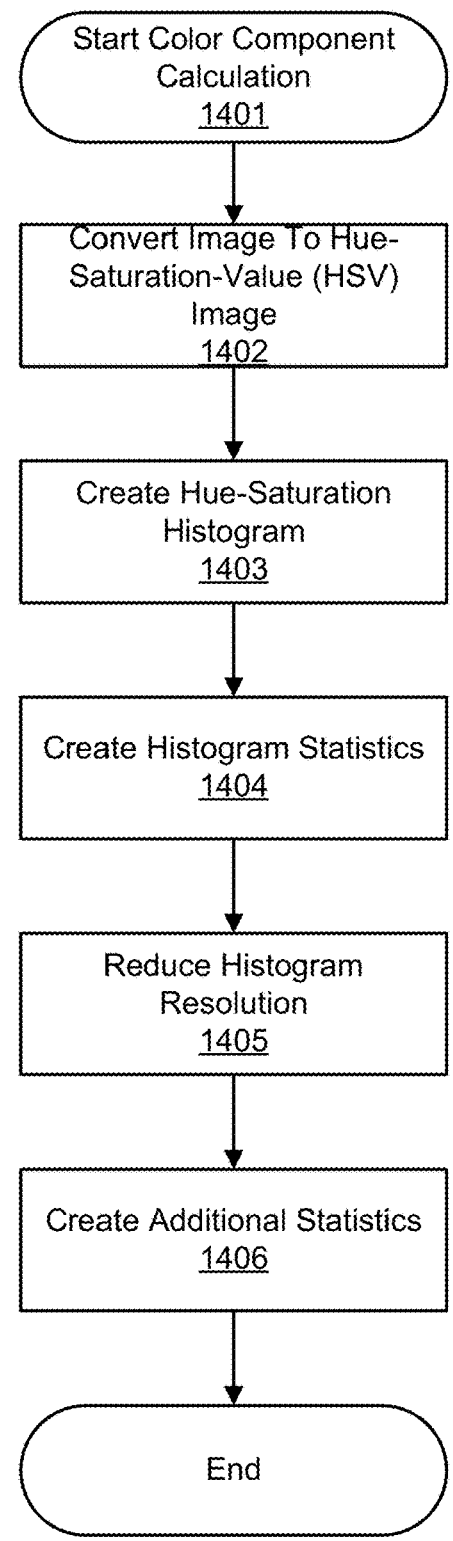
FIG. 14 illustrates a method for generating color components for a pill feature vector according to an embodiment.

Further features are extracted to analyze the pill image's color components, as shown in FIG. 14. In one embodiment, using the original color image, the color component calculation is started 1401. The color image is converted 1402 into a hue-saturation-value image. Next, a two-dimensional histogram is created 1403 based on the hue and saturation values for each pixel. Each bin in the two-dimensional histogram represents a particular combination of hue and saturation and includes the pixels associated with that particular combination. As such, the "value" component of hue-saturation-value is discarded in this embodiment and the histogram does not include the pixel brightness. In an embodiment, the histogram is further normalized to enhance comparison across various histograms. Histogram statistics are calculated 1404, including center of mass coordinates and elliptical axes of the gray value moments. The hue-saturation histogram is next reduced 1405 in resolution. The reduction in resolution of the histogram is similar to the subsampling technique used above with respect to surface features. The reduction in resolution reduces the dimensionality of the feature vector and thereby generalizes the data. Further statistics are calculated 1406 on the reduced-resolution histogram. In one embodiment, the average gray values of each row and column are measured for the reduced-resolution histogram. The additional features extracted from the color histograms are appended to the feature vector.

(h) Combined Image Features

In addition to the individual image statistics, the feature vector for each image is augmented in one embodiment with features representative of the set of images taken for a pill. For example, certain pill types have different colors on different sides of a pill. For these pills, an individual image may capture only one of the colors on the pill, and the pill type is prone to misclassification. Since other images of the pill may include the further colors on the pill, including the color data from other images to the classification of the individual images improve pill classification of that individual image. For example, if a pill is white on one side and blue on the other side, an image of the white side of the pill has a greater chance of being misclassified as a different white pill. However, including information from images that also include the blue side minimizes or eliminates this misclassification.

As such, features from the set of images of a pill are appended to the feature vector for each image. The features which are appended from the set of images can include any features which may vary from different angles of the image and have high discriminatory value. For example, these features can include the color-related features described above as well as the size and shape features described above. With regard to size and shape features, an image of the short dimension of a pill could be misclassified as a different, smaller pill whose long dimension is similar. However, with the inclusion of the maximum long dimension length from another image in the feature vector, such a misclassification can be minimized or eliminated.

As a result of the preceding feature extraction techniques, a feature vector is extracted from the image taken of the pill. Next, the feature vector is used as an input to a classifier or plurality of classifiers to determine which pill the image depicts. Alternatively, the feature vector is used to train the classifiers for later pill identification.

(i) Pill Classification

The pill classifiers can be implemented using a variety of machine learning techniques. For example, the machine learning techniques are implemented in one embodiment using a support vector machine (SVM). Another embodiment uses a Gaussian mixture model. A further embodiment uses a neural network. The classifiers are typically implemented as mathematical functions which take as inputs a feature vector and produce as an output a pill type. For example, the classifier can output a Boolean value indicating a match or not a match, or it can output a range of values indicating a confidence score for a pill type. Typically, the classifier may be trained using a set of pill images identified with a particular pill type, so that the classifier can identify the pill type in a future image. The classifier scores are used for determining which of the pill types is identified in the pill image.

Figure 15:
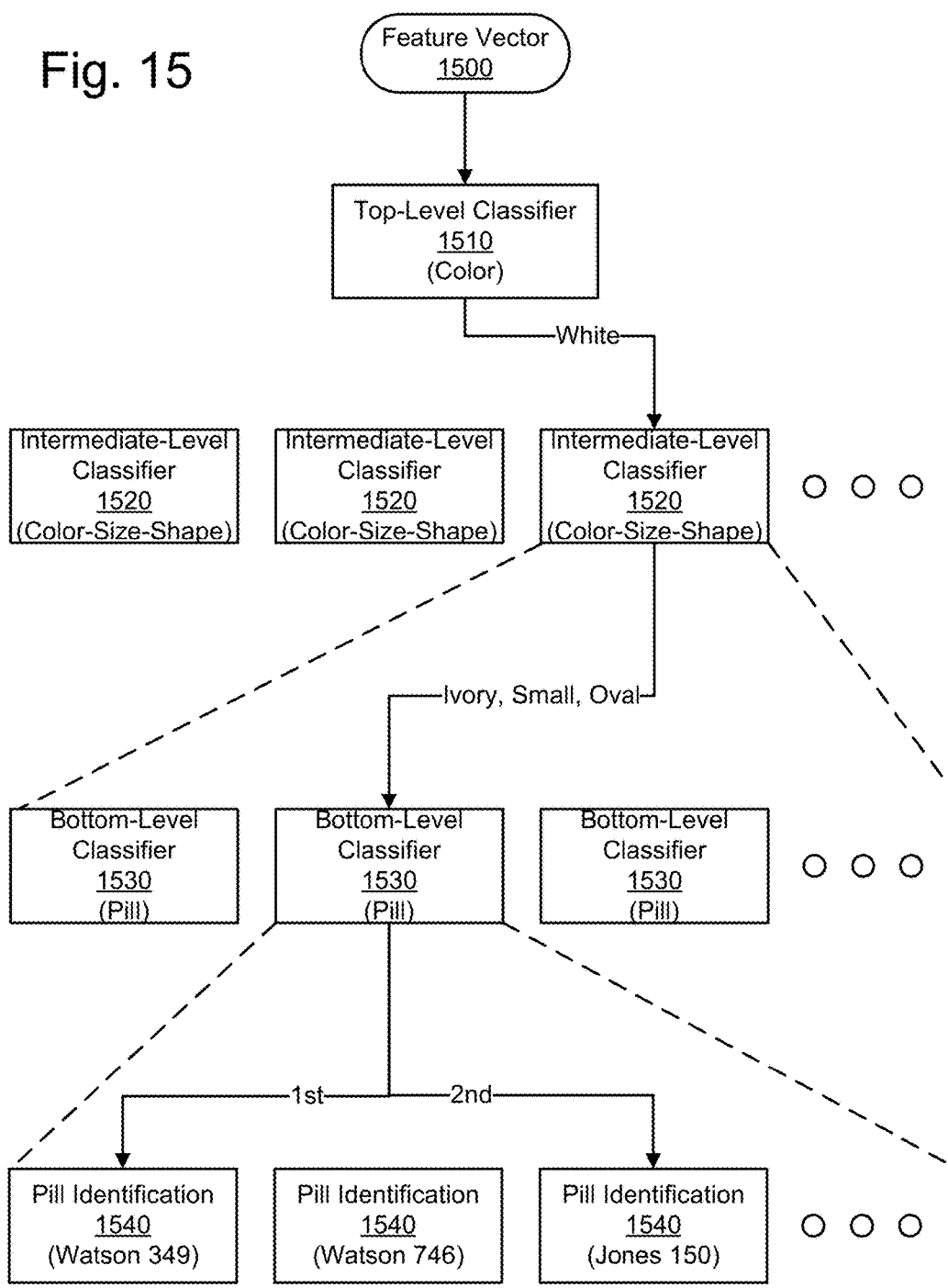
FIG. 15 illustrates a hierarchical classification methodology for identifying feature vectors for pill images according to an embodiment.

FIG. 15 illustrates a hierarchical classification methodology for identifying the feature vectors for the pill images. Since there are thousands or tens of thousands, or more kinds of pills that may be identified, a classifier that attempts to distinguish these individual pills in a single classifier may not produce satisfactory results. In this method, several classifiers are used in a hierarchical fashion to discriminate between types of pills. The feature vector is initially provided to a top-level classifier 1510. The top-level classifier 1510 classifies the feature vector using only the color-based components of the feature vector. In this example, the feature vector of an image includes the color-based features from other pill images taken of the pill. The top-level classifier is configured to determine which cluster of pill types the feature vector belongs to. For example, when using color, the pills may be grouped, or clustered into sets of pills based on the color of the pill. In this case, the top-level classifier 1510 determines the feature vector is a white pill. An intermediate classifier 1520 is chosen that corresponds to white pills.

In this embodiment, the intermediate classifier 1520 further distinguishes pills based on color, size, and shape components in a similar manner to the top-level classifier. In this example, the intermediate-level classifier 1520 classifies the feature vector 1500 as an ivory, small, and oval pill. Thus, the intermediate-level classifier 1520 may differentiate finer color distinctions relative to the top-level classifier 1510. While this description of the classification is helpful for comprehending the hierarchical concepts of pill classification, in practice no such formal definition of the selection of the next-level classifier is made. In particular, each level of pill in the hierarchy may be determined by clustering pills according to the features that will be used at each classification level. That is, the top-level color classifier 1510 is trained by clustering pill types according to color feature vectors and trained to classify pills as cluster 1, cluster 2, and so forth. The "white" description is made merely to further understanding of the hierarchical classification. Thus, for example, the intermediate-level classifiers 1520 may classify feature vectors among a set of bottom-level classifiers 1530 that nominally include pills that are similar to the human eye, such as {ivory, small, oval} and {ivory, medium, oval}.

After identifying a bottom-level classifier 1530 corresponding to the classification by the intermediate-level classifier 1520, the bottom-level classifier 1530 classifies the pill using the entire feature vector. As such, the bottom-level classifier identifies the pill as a particular pill identification 1540. As shown in this example, the bottom-level classifier may also indicate a rank-order of pills, for example indicating that the pill is most-likely the first pill identification 1540 (Watson 349), but also the second most-likely pill identification (Jones 150). Additional rank orders may be further generated by the bottom-level classifier 1530. By using the hierarchical classification method, each level of classifier may focus on the discriminatory features of each level. In addition, each classifier has a limited number of classifications to make, rather than the thousands or tens of thousands that would be used if a single classifier was used. The pill identification 1540 is thus determined for each feature vector.

(j) Classification Scoring

Figure 16:
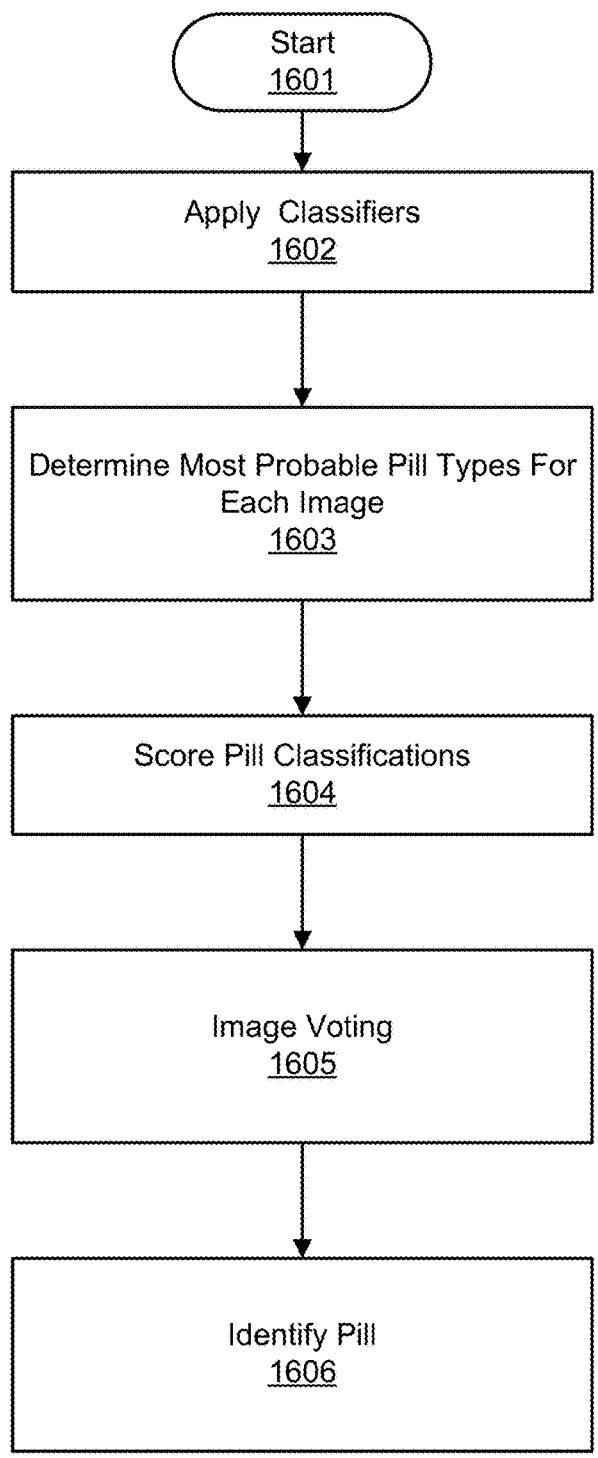
FIG. 16 illustrates a method of pill identification using classifier scoring according to an embodiment.

A method of pill identification using classifier scoring is shown in FIG. 16. In this embodiment, each classification result is used as a "vote" to determine which pill type to ultimately return as the pill type for the pill images. One method of determining which pill type to return is shown in FIG. 16. The method used in this figure illustrates an embodiment where the classifier is a SVM which can return the "most-probable" classification and the "second-most" probable classification, but does not return confidence scores.

At the starting point 1601, the plurality of images taken of the pill have been processed by extracting feature vectors. Next, the classifiers are applied 1602 to each pill image to determine 1603 the most probable and second-most probably pill type for each image. The scoring method proceeds by assigning scores 1604 to the classification results, such as by assigning a 1.0 score for the most-probable classification and a 0.5 score for the second-most probable classification. The scores for the most-probable and second-most probable classification may be modified by a confidence value for the classifications. For a classifier that does not natively provide a confidence value, a confidence value may be determined by analyzing the results of the classifier. For a SVM, the SVM is composed of individual binary classifiers. When the SVM determines a particular pill is more probable than another pill, the individual binary classifiers in the SVM have "voted" for the more-probable pill. Thus, the binary classification results from the bottom-level classifier 1530 may be accessed to determine the results from the individual binary classifiers in the bottom-level classifier 1530. The disparity between the most-probable and second-most probable pill type identification may be used to adjust the scoring between the results. If the second-most probable was distinguishable by fewer binary classifiers, the score for the second-most probable pill classification is increased closer to the value of the most-probable pill identification.

In one embodiment, after determining the scores for the pills of each image, the scores for each image may also be weighed relative to the surface complexity of each image. As described above, the surface complexity feature describes the extent of surface features and other characteristics on each pill image. Thus, the pill images that include less surface feature complexity may have fewer distinguishing characteristics with which to identify an accurate pill type. Thus, the scores associated with pill images with reduced complexity are weighted to reduce the scoring from classification.

The scores are used to vote 1604 for each pill type to tally the classification results for the pill images. The highest-scoring pill type is the type identified as the pill type for the pill. An example of this pill classification system is shown in chart 1 below:

CHART 1

|         | Pill Type 1 | Pill Type 2 | Pill Type 3 | Pill Type 4 |
|---------|-------------|-------------|-------------|-------------|
| Image A | 1.0         | 0.9         | 0           | 0           |
| Image B | 0.75        | 0           | 0           | 0           |
| Image C | 0.8         | 0           | 0.5         | 0           |
| Image D | 0.3         | 0           | 0           | 0.5         |
| Total   | 2.85        | .9          | 0.5         | 0.5         |

Chart 1 shows a set of four images which have been classified according to four pill types. Each image is classified to identify the most- and second-most-likely pill type. The scores in this chart have been adjusted to account for a confidence value and the relative surface feature complexity of each image. The confidence value of the pill classification may be seen by comparing the values of each pill type for an image. For example, image A has a similar score for pill type 2 because the classifier ranked pill types 1 and 2 similar, and in particular may differ by only a few binary classifiers in the bottom-level classifier 1530. The surface feature complexity may be seen by comparing the maximum scores of each image. For example, image A has a maximum score of 1.0, compared to the maximum score for image D of 0.5 because image A has more a complex surface relative to image D and is accorded more weight. The classification scores are tallied, and pill type 1 is identified as the best-scoring pill type among the images. Pill type 1 is identified 1606 and reported as the pill type for the pill. In one embodiment, the total tally must reach a threshold before the pill is identified as a pill type. The use of a threshold reduces the likelihood a pill which has a pill type which has not been trained by the system is mistakenly classified as an existing pill type.

In another embodiment, the classifiers produce a confidence score for each pill type rather than a "most likely" pill type. Using confidence scores, the system can also determine that no pill type is sufficiently confident for a match, and therefore the pill is not identified as a known pill type.

(k) Pill Identification System

Figure 17:
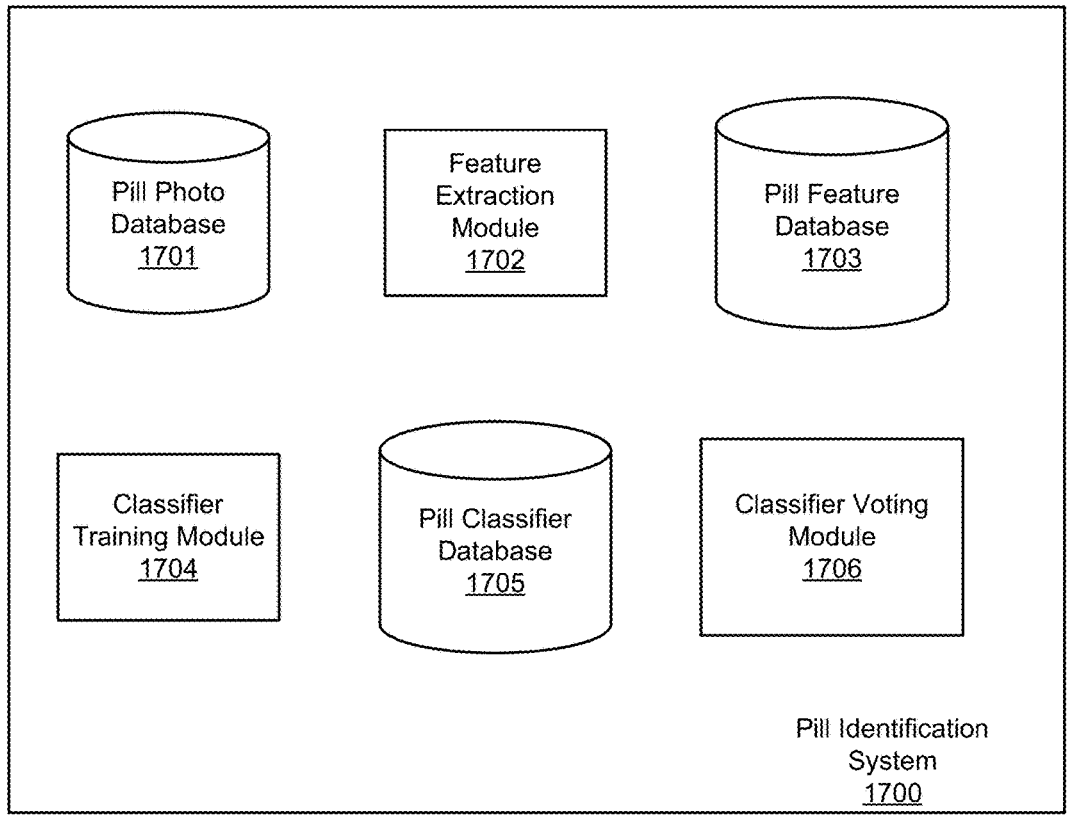
FIG. 17 illustrates a pill identification system according to an embodiment.

An embodiment of a pill identification system 1700 is provided in FIG. 17. The pill identification system 1700 may be connected to the system illustrated in FIG. 1 for capturing pill images. The pill images are provided to the pill identification system 1700 and the resulting pill identification determines the result bin 140 for placing a pill. In other embodiments, the pill identification system 1700 may be separately located from the system capturing pill images.

The pill identification system 1700 includes a pill photo database 1701, which includes raw photos of pills. The pill photo database receives photos taken by a camera and may store them indefinitely or for a specified period. In one embodiment the pill photo database receives new pill photos and maintains the photos only during the pill identification process. The feature extraction module 1702 extracts features from the pill photos as described above by extracting size, shape, color, and surface features from the pill images and constructing feature vectors. The resulting feature vectors are stored in the feature database 1703.

The classifier training module 1704 trains a classifier or a set of classifiers based on the extracted pill features and the pill type designations. The pill type designations are used in conjunction with associated feature vectors to train the classifiers. The trained classifier or classifier set is stored in a pill classifier database 1705 to be used for classifying a new pill. In some embodiments, a pill identification system contains a pre-configured set of classifiers, such that the pill identification system does not train classifiers, and the classifiers are pre-configured. The classifiers can also be loaded from an external source, such as by transmitting classifiers from a network or receiving them from an external non-volatile storage. Thus, an external system may provide updates to change the pills classified by the database. These configurations may omit the classifier training module 1704.

Using the pill classifications associated with each image and feature vector, from the pill classifiers, a classifier voting module 1706 provide a determination of an individual pill. The classifier voting module 1706 can weigh classification voting from a plurality of applied photos as provided above. The classifier voting module 1706 then provides the most-likely pill classification as the pill type to the user or to control a gate 130 and diverter 150 as shown in FIG. 1.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for identifying a pharmaceutical composition, the method comprising:
   receiving a set of features of a first image of the pharmaceutical composition from a first point of view;
   receiving a set of features of a second image of the pharmaceutical composition from a second point of view different from the first point of view;
   generating a feature vector associated with each image of the pharmaceutical composition that includes the features received for that image and one or more features appended from another image;
   applying a plurality of classifiers to each of the feature vectors to determine a set of classifications associated with each image, wherein each classification is associated with a score; and
   determining a pill identification by accumulating the score associated with each classification for each image in the set of images.

2. The computer-implemented method of claim 1, further comprising:
   receiving a pill verification request specifying a desired pill type;
   determining whether the pill identification matches the desired pill type; and
   reporting the determination of whether the pill identification matches the desired pill type.

3. The computer-implemented method of claim 2, the method further comprising directing the pharmaceutical composition to an accepted bin responsive to the pill identification matching the desired pill type and directing the pharmaceutical composition to a rejected bin responsive to a failure to match.

4. The computer-implemented method of claim 1, wherein the received features further include color, shape, size, and surface features.

5. The computer-implemented method of claim 4, wherein the received features of each image are determined by:
   identifying a pill outline of the image;
   applying an erosion filter to the pill outline of the image;
   replicating the pill outline to the exterior of the image after the erosion filter is applied; and
   applying an anisotropic filter to the image after the pill outline is replicated.

6. The computer-implemented method of claim 1, wherein the features include a measure of surface features of the pharmaceutical composition in the image, wherein the measure of surface features is determined for each image by performing the steps of:
   converting the image to a polar coordinate image;
   sub sampling the polar coordinate image; and
   extracting the measure of surface features from the sub-sampled polar coordinate image.

7. The computer-implemented method of claim 1, wherein the appended one or more features in the feature vector associated with each image of the pharmaceutical composition includes at least one of shape, color, and size-related features extracted from the other image.

8. The computer-implemented method of claim 7, wherein the appended features from the other image are sorted with features from the image of the pharmaceutical composition prior to appending the sorted features to the feature vector.

9. The computer-implemented method of claim 1, wherein the plurality of classifiers comprises a set of hierarchical classifiers comprising at least one top-level classifier and at least one bottom-level classifier.

10. The computer-implemented method of claim 9, wherein the feature vectors include color features and the top-level classifier selects a lower-level classifier based on the color features in the feature vector.

11. The computer-implemented method of claim 9, wherein the feature vectors include size and shape features and the set of hierarchical classifiers further comprise at least one intermediate classifier that selects a lower-level classifier based on the size and shape features in the feature vector.

12. The computer-implemented method of claim 9, wherein the at least one bottom-level classifier determines a classification associated with a score based on surface features.

13. The computer-implemented method of claim 1, wherein determining the pill identification by accumulating the score associated with each classification for each image comprises determining a weighting for each image classification based on a confidence level of the respective classifications.

14. The computer-implemented method of claim 1, wherein the feature vector associated with each image includes a surface complexity feature, and wherein determining the pill identification by accumulating the score associated with each classification for each image comprises weighting the set of classifications for each image based on a relative surface complexity feature of the feature vector associated with the image.

15. A computer-implemented method for identifying a pharmaceutical composition, the method comprising:
   receiving a set of features for a first image of the pharmaceutical composition from a first point of view and a set of features of a second image of the pharmaceutical composition from a second point of view different from the first point of view, wherein the received features are developed for each image by:
      identifying, in the image, an outline of the pharmaceutical composition;
      calculating, from the image, a characterization of the image based at least in part on the identified outline;
      reducing the resolution of the characterization of the image;
      extracting, from the reduced resolution characterization of the image, features indicative of surface features of the image which comprise at least a portion of the features developed for the image;
      appending to the set of features one or more features from another image in the set of images;
   providing the set of features for each image to a classification module;
   training a set of hierarchical classifiers based at least in part on the set of features for each image;
   determining a pharmaceutical composition identification by:
      applying the set of hierarchical classifiers to the set of features for each image to determine a set of classifications associated with each image, wherein each classification is associated with a score; and accumulating the score associated with each classification for each image in the set of images.

16. The computer-implemented method of claim 15, wherein the extracting step further extracts color, size, and shape features from the image.

17. The computer-implemented method of claim 15, wherein the outline of the pharmaceutical composition is identified using an edge-detection algorithm.

18. The computer-implemented method of claim 15, wherein the outline of the pharmaceutical composition is identified using a grayscale segmentation algorithm.

* * * * *